United States Patent [19]

Doster et al.

[11] 4,310,560

[45] Jan. 12, 1982

[54] METHOD OF PRODUCING A POROUS, PELLETIZED FOOD PRODUCT

[75] Inventors: Robert C. Doster, Van Nuys, Calif.; Sharon L. Nelson, Spicer, Minn.

[73] Assignee: Carnation Company, Los Angeles, Calif.

[21] Appl. No.: 106,145

[22] Filed: Dec. 21, 1979

Related U.S. Application Data

[63] Continuation-in-part of Ser. No. 895,825, Apr. 13, 1978, abandoned.

[51] Int. Cl.$^3$ .......................... A23L 1/09; A23L 1/30; A23L 2/38

[52] U.S. Cl. .................... 426/285; 426/561; 426/563; 426/656; 426/453; 426/456; 426/512

[58] Field of Search .............. 426/471, 512, 285, 453, 426/456, 561, 562, 563, 99, 103, 454, 656

[56] References Cited

U.S. PATENT DOCUMENTS

| | | | |
|---|---|---|---|
| 3,359,119 | 12/1967 | Milton | 426/285 |
| 3,431,112 | 3/1969 | Durst | 426/285 |
| 3,966,975 | 6/1976 | Hansen et al. | 426/285 |
| 3,978,245 | 8/1976 | Deininger et al. | 426/656 |
| 4,180,593 | 12/1979 | Cohan | 426/471 |
| 4,230,730 | 10/1980 | Lauck | 426/563 |

Primary Examiner—S. Leon Bashore
Assistant Examiner—Steve Alvo

[57] ABSTRACT

A method of producing a porous pelletized food product.

A mixture of finely divided, particulate edible materials, including at least one material which acquires surface stickiness when moistened and a chemical leavening system is contacted with a spray of water and formed into pellets on a pelletizing disc. The moist pellets are contacted with a stream of hot air to effect reaction of the components of the leavening system with the release of carbon dioxide gas to provide the pellets with a porous cellular structure, and to dry the pellets. The resulting dried pellets have a crisp, crunchy, friable texture, and sufficient mechanical strength to permit the pellets to be compacted at a pressure of 500–750 psi without crumbling or disintegration of the pellets. If desired, the pellets may be coated with an edible fat having a relatively high melting point to produce porous, non-hydrating food pellets. The porous pellets, with or without the fat coating are combined with one or more proteinaceous materials and a binder, and compressed into a compact, cohesive food bar.

15 Claims, No Drawings

METHOD OF PRODUCING A POROUS, PELLETIZED FOOD PRODUCT

RELATED APPLICATIONS

This is a continuation-in-part of co-pending application Ser. No. 895,825, filed Apr. 13, 1978, now abandoned.

BACKGROUND OF THE INVENTION

This invention relates to the pelletizing of particulate food materials to produce pelletized food products having unique properties and characteristics. More particularly, the invention relates to the production of porous, cellular pelletized food products having a crisp, crunchy, friable texture, and the use of such porous pellets in food products.

The process of agglomerating powdered food solids to increase its wettability in water has been used for many years. In such procedures, powdered materials are converted to irregularly shaped, random aggregates or clumps which are capable of more rapid solution than in the powered form. Typically, an edible food powder is introduced into the upper portion of a treatment chamber, where the falling particles are contacted with finely atomized water and saturated steam whereby moisture is distributed on the surfaces of the falling particles, with the particles acquiring a surface stickiness. Sufficient comingling of the falling particles takes place whereby the particles adhere together in the form of porous random aggregates which typically have a particle size such that the bulk of the aggregate will pass through a 20 mesh screen (0.84 mm) but remain on an 80 mesh screen (0.177 mm). Such a process, which is commonly referred to as "instantizing", is used in the production of aggregates of a variety of powdered edible materials such as skim milk powder, gelatin, pectin, starch, lactose, coffee, yeast and egg whites, as disclosed in U.S. Pat. Nos. 2,835,586; 2,851,364; 2,856,288; 2,856,290; 2,856,318; 2,897,084; 2,921,854; and 2,950,204, respectively. However, the aggregates or clusters formed by such a process tend to be relatively weak and fragile, and readily crumble and break up if subjected to rough or mechanical handling.

Also, a number of particulate food materials such as powdered flour, cocoa, cane sugar and dried milk are produced in granular form on a conventional pelletizing disc in order to increase the particle size of the material and to reduce the amount of fines usually associated with the handling of such powdered materials. In such an operation, the material, in finely divided form, is deposited on the surface of an inclined, rotating disc where it is contacted with water or a binder solution and maintained on the disc until the desired granule size is obtained. The pelletized products thus formed are relatively hard, dense and non-porous and typically are about 3 mm. in size. Such pelletized food products generally are soluble in water and are used in applications in which solubility in water is in essential requirement.

SUMMARY OF THE INVENTION

The present invention provides a crisp, friable pelletized food product having a porous, cellular structure which has sufficient mechanical strength to permit the pellets to be mixed and/or compacted under pressure without crumbling or disintegration. The porous pelletized product of this invention is formed by depositing on the surface of a pelletizing disc a mixture of particulate edible materials including at least 15% by weight of one or more edible materials which are capable of agglomerating by inter-particle adhesion when the surfaces of the particles are moistened, and from 1% to 35% by weight of a chemical leavening system comprising sodium bicarbonate and an ebible leavening acid. The particulate mixture is moistened, tumbled and rolled on the pelletizing disc until moist agglomerates of the desired size are formed and ejected from the disc. The moist agglomerates thus formed are contacted with a stream of hot air to effect reaction of the components of the chemical leavening system contained in the agglomerates, with the release of carbon dioxide gas, and to reduce the moisture content of the agglomerates to about 1%-3% by weight, thereby providing the agglomerates with a porous internal structure. The agglomerates thus formed have a porous, cellular structure but have sufficient mechanical strength to permit their compaction at pressures up to 500-750 psi without crumbling or disintegration of the agglomerates. If desired, the dried agglomerates may be coated with an edible hydrophobic material having a melting point above about 90° F.

The porous, cellular agglomerates, with or without the hydrophobic coating, are combined with one or more proteinaceous materials and a binder and compressed in a confined mold to form a cohesive food bar. The dried pellets may also be used in a variety of food products where it is desired to impact a crisp or crunchy texture, such as certain desserts, condiments and snack items.

DETAILED DESCRIPTION OF THE INVENTION

According to the invention, a dry blend is prepared, using suitable apparatus, of the particulate edible materials which are to constitute the pelletized product. Virtually any edible material which is available in finely divided form may be used, with the selection of materials used depending primarily upon the intended end use of the pellets. For example, any one or a mixture of the following materials may be used in forming the dry mix: sugar, such as dextrose, lactose, sucrose, corn syrup solids; starches, such as those derived from wheat, corn, rice, oats, potatoes, tapioca, and the like, including pregelatinized starches; dried milk products; proteinaceous materials, such as vegetable protein hydrolysates, concentrates and isolates, whey solids, egg white solids, casein, casein salts, and the like; dehydrated citrus juices, fruit juices and vegetable juices; powdered coffee concentrate; vitamins; minerals; coloring; flavoring and the like. Mixtures of two or more particulate materials may be used, provided that the mixture contains at least 15% by weight of a material which is capable of agglomerating by interparticle adherence when the surfaces of the particles are moistened by an aqueous medium. That is, at least 15% by weight of the mixture to be pelletized must consist of one or more particulate edible materials which, when moistened, acquire surface stickiness or tackiness so that when the particulate mixture is tumbled and rolled on a pelletizing disc, the particles adhere together to form pellets or agglomerates. In general, most hygroscopic edible materials become somewhat self adherent when moistened and may be used as this component of the particulate mixture. Preferably sugars, starches, dried milk products or crystalline lactose powder are used as the component which acquires surface stickiness. However it is to be understood that other particulate edible materials which are capable of agglomerating by reason of their capacity for becoming self-adherent when superficially moistened may also be used, such as for example, dried coffee extract, dehydrated allium powders, egg white powder, and the like.

The particulate mixture also includes as an essential ingredient, a chemical leavening system comprising sodium bicarbonate and a particulate edible leavening acid. Suitable leavening acids which may be used include sodium aluminum phosphate, sodium acid pyrophosphate, sodium aluminum sulfate, dicalcium phosphate dihydrate, monocalcium phosphate and glucono delta lactone, and mixtures thereof. In general, the chemical leavening system may comprise from about 1% to 35% by weight of the particulate mixture, with amounts of between 1% and 5% by weight being preferred.

The chemical leavening system functions to provide the pelletized product with a porous cellular structure. Thus, as described hereinbelow, the mixture of particulate edible materials, including the chemical leavening system, is deposited on a pelletizing disc where it is moistened and formed into moist agglomerates. The moist agglomerates are contacted with a stream of hot air to not only reduce the moisture content of the agglomerates, but to also effect reaction between the bicarbonate and leavening acid components of the chemical leavening system to yield carbon dioxide gas and edible reaction salts. The gaseous carbon dioxide released in the partially dried pellets causes the pellets to expand and provides the pelletized product with a porous, cellular structure. Since a significant amount of carbon dioxide is not released until the pellets have been heated and partially dried, the pellets have sufficient strength to retain this porous cellular structure without suffering any significant collaspe. The reaction salts formed in the pellets will, of course depend upon the specific leavening acid used, as is well-known in the baking industry.

The proportions of sodium bicarbonate and leavening acid used in the chemical leavening system of the particulate mixture are such that the bicarbonate and acid will react completely to produce substantially neutral reaction products with little, if any, unreacted bicarbonate or acid remaining in the dried, pelletized product. The specific proportions used will, of course, depend upon the neutralizing value of the leavening acid used, as is well known in the art. A preferred chemical leavening system comprises a mixture of equal parts by weight of sodium bicarbonate and sodium aluminum phosphate.

According to a preferred embodiment of the invention, the particulate mixture to be pelletized also contains from about 5% to 45% by weight of one or more of the proteinaneous materials disclosed hereinabove. Preferably particulate soy protein isolate, calcium caseinate, whey solids and egg white solids, alone or in combination, are used as the proteinaeous component of the mixture.

The particulate materials used in forming the dry blend should have a moisture content of no more than about 6% and must be in finely divided form, that is, the bulk of the material will pass through a 100 mesh (U.S. Standard) screen, in order to prevent the formation of pellets which are fragile.

The particulate mixture of edible materials is then contacted with water or other aqueous liquids while the particles are tumbled and rolled to moisten the particles and form free flowing granules or pellets of a desired zone. Pelletizing of the particulate mixture is carried out on a conventional pelletizing disc in which the particulate mix of edible materials is continuously deposited onto the surface of a rotating inclined disc on which the dry particulate material is carried beneath a spray of water so that tiny pellets or seeds first form and then increase in size as rotation of the disc is continued, with the moistened particles being tumbled and rolled on the disc until pellets of the desired size are formed and discharged from the disc. Thus, the particles on which water is sprayed, develop surface stickiness and agglomerate together while moving through a certain angular distance over the surface of the disc before following back toward the lower rim of the disc. As rotation of the disc continues, the agglomerates rise to the surface of the particulate mix and overflow the rim when they have reached the desired size.

As is well known, the size of the pellets produced on a pelletizing disc is controlled by a number of factors, including the angle and speed of the disc, the position of the plows, the location of the dry feed addition and the water spray, and the rate of water addition. The specific conditions will vary with each dry mix formulation and can be readily established by routine experimentation. In accordance with the present invention, these factors are controlled to produce pellets having a particle size such that the bulk of the pellets will pass through a 6 mesh screen and will be retained on a 20 mesh screen, and will have a moisture content of about 10%–20%. Typically, the disc is inclined at an angle of about 45° and is rotated at a speed of about 15–25 rpm. The diameter of the disc used is commonly on the order of about 3 feet to 6 feet or more.

The moist pellets thus formed are contacted with a stream of hot air until the moisture content of the pellets is reduced to about 1% to 3% by weight, with a maximum moisture content of about 1.75% being preferred. The pellets are maintained in contact with the hot air at a temperature and for a time sufficient to not only reduce the moisture content of the pellets, but to also effect reaction between the sodium bicarbonate and leavening acid particles in the pellets with the release of carbon dioxide and the formation of edible reaction salts. Preferably the pellets are dried as a fluidized bed, in one or more stages, in air having a temperature of between about 125°–250° F. for 3–20 minutes, with the higher temperatures being applied in the later drying stages. In accordance with a preferred embodiment of the invention, the moist pellets ejected from the disc are passed through a plurality of conventional tray type dryers in which hot air is circulated upwardly through a screen and through a layer of the pellets to maintain the pellets in a fluidized state. In the first tray dryer the pellets are given a preliminary drying, mostly surface drying, by circulating air having a temperature of about 125° F.–150° F. through a relatively thin layer of pellets, i.e. a layer about 1 to 3 pellets deep for about 3–8 minutes. The partially dried pellets are then moved through one or more additional tray dryers in which a bed of pellets several inches in thickness is maintained in a fluidized state by passing hot air (225° F.–250° F.) upwardly through the bed for about 8–17 minutes.

Since the pellets are partially dried before they are heated to a temperature sufficient to effect reaction of the bicarbonate and leavening acid with the release of carbon dioxide, the pellets have sufficient strength at the time carbon dioxide is released to resist collaspe. Consequently as the gas is released the pellets are expanded in volume and develop a porous, cellular internal structure, with the dried pellets having a crisp, crunchy texture and sufficient mechanical strength to permit handling, packaging, shipping, mixing or compacting of the dried pellets without crumbling or disintegration. The dried, porous pellets thus produced have a bulk density of about 300-400 gms per liter and a particle size such that the bulk of the pellets will pass through a 6 mesh screen and be retained on a 20 mesh screen.

The dried pellets may be used in a variety of food products where it is desired to impart a crisp, crunchy texture. In accordance with an embodiment of the invention the pellets are used in the production of compacted, cohesive food bars. To produce such bars, the dried, porous pellets are mixed with a suitable binder and other ingredients such as one or more proteinaceous materials, water soluble solids, flavors, and the like, and the mix is placed in a mold cavity where it is subjected to pressure on the order of about 500–700 psi for about 0.25 to 1.5 seconds or more to form a cohesive food bar. The binder preferably includes as its principal component an edible fat having a melting point above about 90° F. so that the fat may be liquified by heating for intimate contact with the pellets but will readily solidify and remain in a solid state at temperatures usually encountered in handling, shipping and storage of food products. Such normally solid fats which may be used include hydrogenated or partially hydrogenated vegetable oils such as cottonseed oil, soybean oil, palm oil, corn oil, and the like, including mixtures thereof, butterfat, cocoa butter, beef tallow, etc.

Preferably the binder also includes one or more water soluble solutes, that is, materials which have the effect of depressing the water activity of the food product to levels below which most bacteria will not grow, in addition to their binding effect on the pellets. Such water soluble solutes include sugars such as glucose, fructose, galactose, lactose, sucrose, dextrose, invert sugar and the like; and polyhydric alcohols such as glycerine, propylene glycol, sorbitol, and the like. Such water soluble solutes, if used, are present in the binder in amounts sufficient to provide the food bar with a water activity of below about 0.9, preferably below about 0.85.

In addition, one or more proteinaceous materials, in particulate form, are preferably also mixed with the dried pellets in order to produce food bars having a relatively high protein content, that is, 20% or more. For example, whole or non-fat dry milk solids, soy protein isolate, egg white solids, whey solids, caseinate salts and the like, including combinations thereof, may be mixed with the dried pellets and binder to be compressed into food bars. In such a mixture, the dried, porous pellets comprise about 40% to 60% by weight of the mix, with the binder comprising from about 15% to 25% by weight of the mix.

In preparing the mix to be compressed, the normally solid fat is first heated, typically to about 140° F., until liquified, and while still in a liquid state is admixed with the pellets, proteinaceous materials, water soluble solutes and other optional ingredients such as flavoring, vitamins, minerals, etc. When the ingredients of the mix have been combined, the temperature of the mix is reduced, by any suitable means, to below about 80° F., preferable below about 50° F., to promote rapid solidification of the fat when the mix is compressed. The cooled mix is placed in a mold cavity and subjected to molding pressure of about 500-750 psi for about 0.25-1.5 seconds, to thereby produce a cohesive food bar, without excessive crumbling or fracture of the pellets. The resulting bar may, if desired, be enrobed with a flavored confectioner's coating, such as one containing a base of cocoa butter or the equivalent and optionally a flavor.

In addition to their use in the production of food bars, the dried porous pellets can be used to impart a crisp, crunchy texture to a variety of foods, such as desserts, condiments and snack items. For use in such applications the pellets are preferable provided with a coating of an edible, normally solid fat whereby the coated pellets are non-hydrating or slow hydrating in the presence of moisture. This enables the pellets to be used to impart texture to food products even in the presence of substantial amounts of water. The fat should have a bland or neutral flavor and a melting point above about 90° F., preferably between 90° F. and 150° F., so that the fat may be liquified by heating for ready application but will remain in a solid state at the temperatures usually encountered in handling, shipping and storage of food products. Fats which may be used to provide such a coating are the same as the fats disclosed hereinabove.

In order to provide such a coating on the pellets, the fat is heated until it is in a liquid state and, while liquified, is applied to the pellets by any suitable means such as spraying, dip coating, pan coating, and the like to provide a substantially uniform coating of fat on the surface of each of the pellets after which the pellets are allowed to cool to solidify the fat coating. The amount of fat applied to the pellets should be sufficient to provide a fat coating which comprises from about 5%-50% by weight of the finished pellets. The specific amount of fat coating on the pellets will depend primarily on the intended use of the pellets. For example, if the pellets are to be used to impart texture to a product having a relatively low moisture content, smaller amounts of fat, i.e. 5%-10% by wt. of the pellet weight, may be used. However, if the pellets are to be used to impart texture to a product containing substantial amounts of water, such as in pudding mixes, larger amounts of fat, i.e. 35%-50% by wt, are used. Such pellets will retain their crispness in cold water for at least 60 minutes.

Such fat coated pellets may be used in a variety of products to impart a desired degree of crunchiness and crispness to the product. For example, the coated pellets can be added to the dry mix for an instant cold-set pudding so that when the mix is reconstituted with water, the resulting product has a crunchy texture. If desired, the fat coated pellets may be used in the production of food bars, as described hereinabove.

The following example is given to further illustrate, not to limit, the invention. In the specification, appended claims and the following example, all parts and percentages are by weight and all screen sizes refer to U.S. Standard screen sizes, unless otherwise indicated.

EXAMPLE

A dry blend is prepared of the following ingredients, each of which are in finely divided form so that the bulk of each ingredient passes through a 100 mesh screen.

| Ingredient | % by wt. |
| --- | --- |
| Sucrose | 55 |

-continued

| Ingredient | % by wt. |
| --- | --- |
| Proteinaceous Materials (whey protein concentrate, calcium caseinate, soy protein isolate) | 37 |
| Sodium bicarbonate | 1 |
| Sodium aluminum phosphate | 1 |
| Vitamin-minerals-flavoring | 6 |

The dry blend is agglomerated on a 36 inch diameter pelletizing disc inclined at 45° to the horizontal and rotated at about 20 rpm, with a plurality of plows being positioned at or near the periphery of the disc along its upper edge. The dry mix is fed onto the disc at a maximum rate of about 2.3 Kg per min. and water is sprayed onto the powdered mix at a rate of about 0.36 Kg per min. The agglomerates thus formed are maintained on the disc until they are of a size such that the bulk of the material will pass through a 6 mesh screen and be retained on a 20 mesh screen. Thus, the pelletized mix has a moisture content of 10%-20% and a diameter of between about 0.8-3.5 mm.

The resulting pellets are then dried in a fluidized bed dryer having 1 or more zones at a temperature of between 125° F.-250° F. to reduce the moisture content of the pellets to no more than 3%. The dried pellets have a porous, cellular structure and a bulk density of about 300-350 gms per liter.

In order to provide the pellets with a hydrophobic coating, a quantity of hydrogenated vegetable fat having a melting point of about 100° F. and a bland flavor is heated to about 140° F. to liquify the fat. While still in a liquid state the fat is sprayed onto the dried pellets at a rate of about 7-10 gms fat per 100 gms of pellets, with agitation, to provide a uniform fat coating on the pellets.

After solidification of the fat coating, the coated pellets are intimately mixed with one or more proteinaceous materials such as egg white solids, soy protein isolate, non-fat dry milk solids, and the like, vegetable fat, invert sugar, glycerol and flavorings, with the coated pellets comprising about 40%-60% by weight of such mix. The mix is introduced into a suitable mold and subjected to pressure of about 500-700 psi for about 0.25-1.5 seconds to provide a food bar having a crisp, crunchy texture.

What is claimed is:

1. A method of producing a porous, pelletized food product which comprises
    forming a mixture of finely divided particulate edible materials including at least 15% by weight of a material which acquires surface stickiness when moistened, and from about 1% to 35% by weight of a chemical leavening system comprising sodium bicarbonate and a leavening acid,
    spraying said mixture with an aqueous liquid while the particulate materials are tumbled and rolled to moisten the particles and form agglomerates of said materials, said agglomerates having a moisture content of about 10%-20% by weight, and
    contacting said agglomerates with a stream of hot air having a temperature of between 125° F.-275° F. for 3-20 minutes to effect reaction of the components of the chemical leavening system thus releasing carbon dioxide gas and forming a porous structure within said agglomerates, and to dry said agglomerates to a moisture content of about 1%-3% by weight to produce a porous, pelletized food product.

2. The method defined in claim 1 in which the particulate edible materials have a particle size such that the bulk of the material passes through a 100 mesh screen.

3. The method defined in claim 1 in which said leavening acid is selected from the group consisting of sodium aluminum phosphate, sodium acid pyrophosphate, sodium aluminum sulfate, dicalcium-phosphate dihydrate, monocalcium phosphate, glucono delta lactone, and mixtures thereof.

4. The method defined in claim 3 in which the proportions of sodium bicarbonate and leavening acid in said mixture are such that the dried agglomerates contain substantially no unreacted sodium bicarbonate or leavening acid.

5. The method defined in claim 3 in which said mixture contains from 1% to 5% by weight of a chemical leavening system consisting of equal parts by weight of sodium bicarbonate and sodium aluminum phosphate.

6. The method defined in claim 1 in which said mixture also contains about 5% to 45% by weight of particulate proteinaceous material.

7. The method defined in claim 1 in which said mixture comprises about 40% to 60% by weight of sugar, about 20% to 45% by weight of a proteinaceous material selected from the group consisting of nonfat dry milk solids, whey solids, casein, casein salts, vegetable protein, and mixtures thereof, and about 1% to 5% by weight of a chemical leavening system consisting of equal parts by weight of sodium bicarbonate and sodium aluminum phosphate.

8. The method defined in claim 1 in which the mixture is sprayed with water while the particulate materials are tumbled and rolled on a pelletizing disc under conditions adapted to form agglomerates having a size such that the bulk of the agglomerates will pass through a 6 mesh screen and be retained on a 20 mesh screen.

9. The method defined in claim 1 in which the agglomerates are contacted with the hot air stream by first passing air having a temperature of about 125° F.-175° F. upwardly through a relatively thin layer of agglomerates and thereafter passing air having a temperature of about 225° F.-275° F. upwardly through a bed of substantial depth of agglomerates to provide a fluidized bed of agglomerates.

10. The method defined in claim 1 in which the porous dried agglomerates are coated with a liquified edible hydrophobic coating having a melting point above about 90° F., said coating comprising 5%-50% by weight of the dried agglomerates, and the coated agglomerates are then cooled to a temperature below the melting point of said hydrophobic material.

11. The method defined in claim 1 in which the porous agglomerates are admixed with at least one proteinaceous material and vegetable fat, with the agglomerates comprising about 40%-60% by weight of said admixture, and said admixture is subjected to a pressure of about 500-750 psi in a confined mold for 0.25-1.5 seconds to thereby form a cohesive food bar.

12. The method defined in claim 11 in which the temperature of said admixture is maintained below about 80° F.

13. A method of producing a porous, pelletized food product having a crisp, crunchy texture which comprises
    depositing on the surface of a pelletizing disc a mixture of particulate edible materials including at least 15% by weight of a material which acquires surface stickiness when moistened, and from about 1% to 35% by weight of a chemical leavening system comprising sodium bicarbonate and a leavening acid, contacting the particulate materials with an aqueous liquid while the materials are tumbled and rolled on the pelletizing disc to moisten the particles and form moist agglomerates of said materials, said agglomerates having a moisture content of between about 10%–20% by weight, and contacting said moist agglomerates with a stream of hot air having a temperature of between 125° F.–275° F. for 3–20 minutes to dry the agglomerates to a moisture content of about 1%–3% by weight and to effect reaction of the components of the chemical leavening system thus forming substantially neutral edible leavening reaction products and releasing carbon dioxide gas in said agglomerates whereby the agglomerates are provided with a porous cellular structure thus forming a pelletized food product having a crisp, crunchy texture.

14. The method defined in claim 13 in which the moist agglomerates are retained on the pelletizing disc until the agglomerates have a particle size such that the bulk of the pellets will pass through a 6 mesh screen and be retained on a 20 mesh screen.

15. The method defined in claim 13 in which the dried porous agglomerates have a bulk density of about 300–400 gms. per liter.

* * * * *